C. F. A. RÖELL.
WATER CURRENT POWER SYSTEM.
APPLICATION FILED MAY 5, 1909.

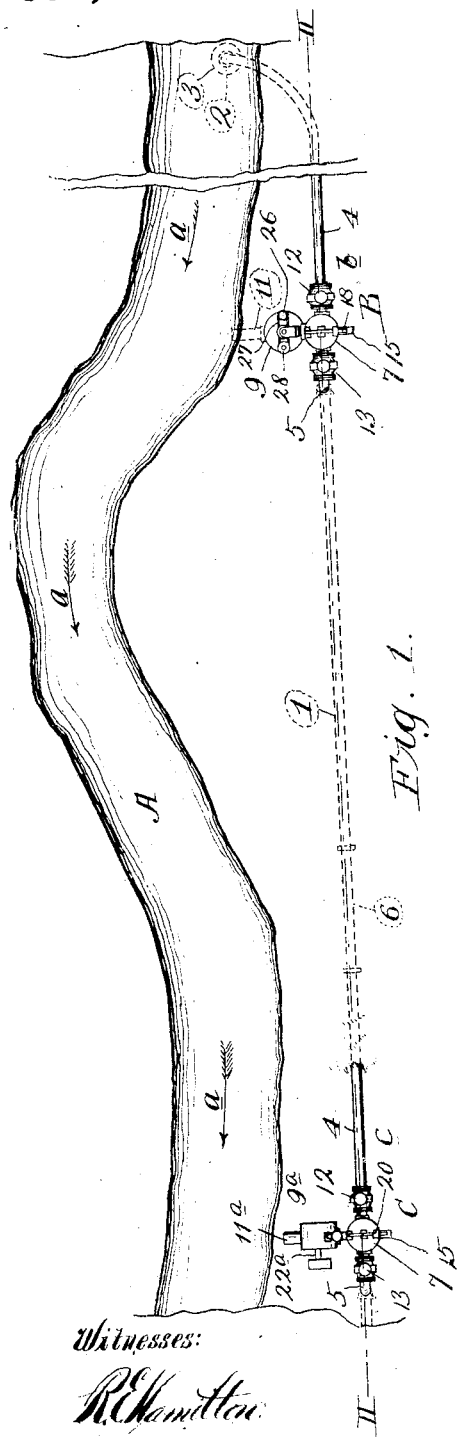
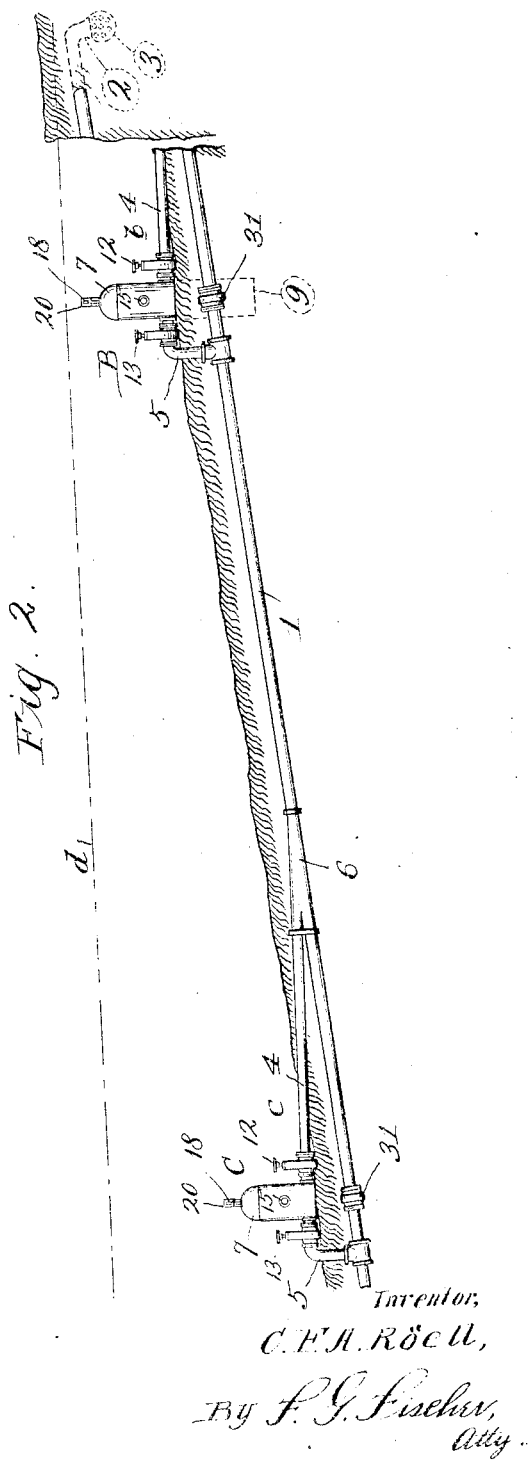

954,999.

Patented Apr. 12, 1910.
2 SHEETS—SHEET 2.

Witnesses:
R. Hamilton
M. Cox

Inventor,
C. F. A. Röell,
By F. G. Fischer, Atty.

UNITED STATES PATENT OFFICE.

CORNELIS F. A. RÖELL, OF INDEPENDENCE, MISSOURI.

WATER-CURRENT POWER SYSTEM.

954,999.

Specification of Letters Patent. Patented Apr. 12, 1910.

Application filed May 5, 1909. Serial No. 494,185.

*To all whom it may concern:*

Be it known that I, CORNELIS F. A. RÖELL, a citizen of the United States, residing at Independence, in the county of Jackson and State of Missouri, have invented certain new and useful Improvements in Water-Current Power Systems, of which the following is a specification.

My invention relates to improvements in water-current power systems, and it embraces a series of power stations extending down stream and deriving their source of power through a conduit, from a point up stream above the initial station. By establishing a series of stations and supplying the same from a point up stream through a conduit instead of direct from the stream at a point on a level with each station, the necessity for digging deep wells to carry off the tail-water from the power wheels which I employ is obviated, as the water in the conduit can be carried above the surface of the stream at the stations and thus have sufficient fall to run said power-wheels, as will hereinafter appear. Further advantages are that the supply of water to the stations is constant irrespective of whether the stream is high or low, and navigation is not interfered with as the conduit may be either laid along the river-bed or upon the bank, and when the latter method is employed, the conduit may be laid in a comparatively straight line and thus avoid the expense of following the irregular course of the river.

Figure 3:
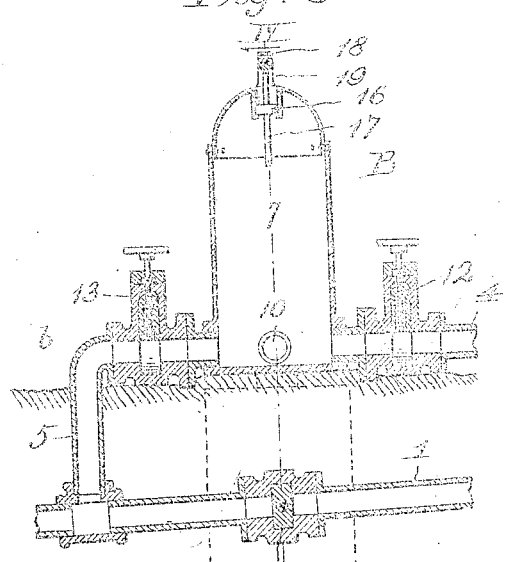
Figure 4:
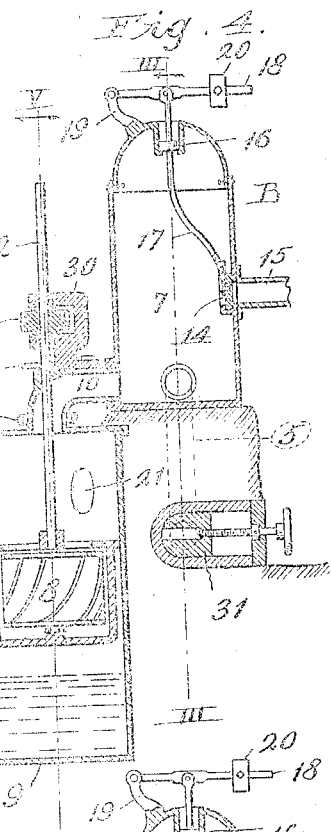
Figure 5:
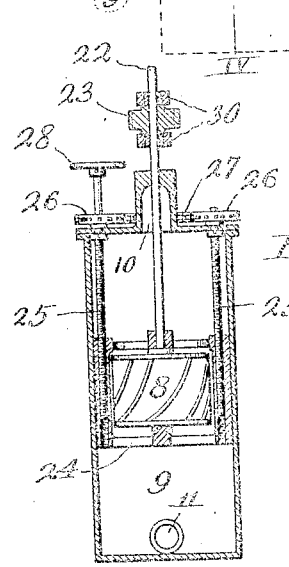
Figure 6:
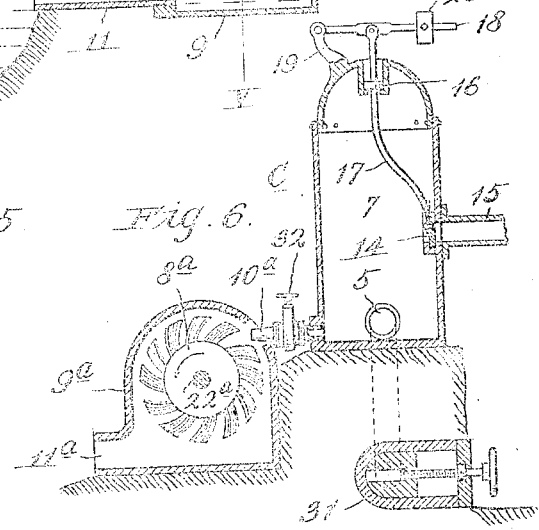

Referring now to the accompanying drawings, which illustrate the invention: Figure 1 shows a plan view of my system arranged beside a stream from which it derives its power. Fig. 2 is a vertical section on line II—II of Fig. 1. Fig. 3 is a vertical section of one of the power stations on line III—III of Fig. 4. Fig. 4 is a vertical section on line IV—IV of Fig. 3. Fig. 5 is a vertical section on line V—V of Fig. 4. Fig. 6 is a section of another power station.

A designates the stream, which is flowing in the direction of the arrows a.

1 designates a conduit of substantially the same pitch as the stream, and having an intake 2 at its upper terminal, which is protected by a strainer 3 from the entrance therein of drift-wood, or other debris likely to choke the conduit. In the drawings I have shown all but the submerged intake of the conduit buried in the ground beside the river to avoid following the bends in the latter, into which the conduit discharges at its lower terminal.

B and C designate two power stations, communicating with the conduit through by-passes b and c, comprising inlet branch-pipes 4 and vertical discharge pipes 5. Branch-pipes 4 conduct the water, which they receive from the conduit, to points above the surface of the stream nearest the power stations, so that sufficient fall may be had to operate the power-wheels at said stations. In order that part of the water may be taken from the conduit without appreciably retarding its momentum, I arrange the branch-pipes 4 in substantially a horizontal plane and connect their inlet ends to the conduit with Y's 6, thus avoiding abrupt bends. Branch-pipes 4 discharge into pressure-tanks 7, wherein large heads of water are accumulated for driving the power-wheels which I prefer to employ in the form of turbines 8, located in wells or chambers 9 sunk below the bottom of the adjacent pressure-tanks with which they communicate through pipes 10, and are provided at their lower ends with outlet-pipes 11, through which the tail-water escapes back into the stream. The flow of water through pipes 4 and 5 is controlled by gate-valves 12 and 13, respectively. Each well has a cover to prevent the water overflowing therefrom and hence there will be no loss of power from this cause. As the level of the water in the pressure-tanks fluctuates to a certain degree with the rise and fall of the stream, the air in the domes of said tanks is compressed at times to a considerable degree and thereby subjects the same to an intense strain, so in order to prevent rupture of the tanks I provide each with a safety-valve, comprising a sliding-valve plug 14 normally closing the outlet to a waste-pipe 15, a valve-plug 16 connected to plug 14 by a stem 17, a lever 18 pivotally-connected to the upper end of the stem 17 and fulcrumed to a bracket 19, and provided with a counter-weight 20 whereby the valve is normally held in closed position. When the pressure within the tanks becomes sufficiently great it will raise plugs 16 against the action of the counter-weights 20 and open communication with the waste-pipes 15, through which the water escapes until the pressure within the tanks is reduced to normal. By thus automatically controlling the pressure in the tanks, a steady flow to the turbines is insured, and the same will be driven at constant speed. Wells 9 are provided with manholes 21, through which access may be had to the interior thereof for the purpose of repairing the turbines when necessary. They are also closed at their upper ends so that the water cannot escape without first passing through the turbines.

As it is desirable to maintain the turbines at a predetermined height above the level of the adjacent portion of the stream, I fix each turbine upon a vertical shaft 22, slidably mounted at its upper portion in a gearwheel 23 and journaled at its lower portion in a basket 24 adjustably-engaged by a pair of oppositely-disposed screws 25, journaled at their upper ends in the top of the well-casing, and provided with fixed sprocket-wheels 26, connected by an endless sprocket-chain 27 so that the screws may be turned in unison to raise or lower the basket by properly manipulating a hand-wheel 28. The upper portion of the basket has a marginal flange 29 fitting snugly within the well-casing to prevent the escape of water between it and said casing. Gear-wheel 23 is provided for the transmission of power from the turbine and is prevented from moving vertically with the shaft 22 to which it is connected by the customary groove-and-feather not shown, by a bearing 30 fixed to pipe 10 and engaging the opposite sides of the gear-wheel hub.

When the water in the stream is at low stage, it may become necessary to direct all the water in the conduit through the by-passes $b$ and $c$ to act on the turbines, so I provide said conduit with gate-valves 31, located at the stations between pipes 4 and 5. By closing said valves the water will be forced through the by-passes.

Assuming that the stream is at its normal stage, the operation at each station is substantially as follows: Valve 12 is opened sufficiently to admit the desired volume of water to the pressure-tank 7, where it divides, a portion flowing to the turbine 8, and the remainder returning to the conduit through pipe 5, the flow through said pipe being regulated by the valve 13 which may be partly closed when it is desired to deflect the greater portion of the flow to the turbine. Valve 13 is closed when it is desired to direct all the flow to the turbine, which latter is lowered so that additional fall of the water before striking the turbine will compensate for the comparatively small flow thereto. When the stream is at high stage, the turbine is adjusted upwardly the proper level above the adjacent surface of the stream, and valve 12 is partly closed to prevent the water from rushing too rapidly into the pressure-tank, which, however, being provided with the safety-valve is guarded from any undue pressure which might arise from the water attaining an abnormal height therein. Should the apparatus at one of the stations get out of order, said station may be cut off for repairs without interfering with the other stations by closing its valves 12 and 13. By normally confining all the water except that which escapes through pipes 11 and the lower terminal of the conduit, it is obvious that the force of the water will increase with its distance from the intake 2, and hence each succeeding station will develop more power than the preceding one according to its distance below a horizontal plane (indicated by dotted line $d$) extending through said intake.

In Fig. 6 I have shown an enlarged view of station C which is a duplicate of station B, except that I substitute an over-shot wheel $8^a$ for the turbine 8, and drive said over-shot wheel by a jet discharged from a nozzle $10^a$ leading from the bottom of the pressure-tank, and controlled by a valve 32. Wheel $8^a$ is mounted upon a shaft $22^a$, journaled in a casing $9^a$, having a waste-pipe $11^a$ through which the water is discharged from said casing after acting upon the wheel.

Having thus described my invention what I claim is:—

1. In a system of the character described, a conduit for conducting water from an upper to a lower point of a stream, a pressure-tank communicating with said conduit, a power wheel adapted to be driven by the discharge of water from said pressure-tank, and a well in which the power wheel is mounted, said well being below the pressure-tank and having an outlet in its lower end through which the water is discharged.

2. In a system of the character described, a conduit for conducting water from an upper to a lower point of a stream, a pressure-tank communicating with said conduit, a power wheel adapted to be driven by the discharge of water from said pressure-tank, a well in which the power wheel is mounted, said well being below the pressure-tank and having an outlet in its lower end through which the water is discharged, and means for adjusting said power wheel vertically within the well.

3. In a system of the character described, a conduit for conducting water from an upper to a lower point of a stream, a pressure-tank communicating with said conduit, a power wheel adapted to be driven by the discharge of water from said pressure-tank, a well in which the power wheel is mounted, said well being below the pressure-tank and having an outlet in its lower end through which the water is discharged, a shaft on which the power wheel is fixed, a basket in which said shaft is journaled, and means for adjusting said basket vertically.

4. In a system of the character described, a conduit for conducting water from an upper to a lower point of a stream, a pressure-tank communicating with said conduit, a power wheel adapted to be driven by the discharge of water from said pressure-tank, a well in which the power wheel is mounted, said well being below the pressure-tank and having an outlet in its lower end through which the water is discharged, a shaft on which the power wheel is fixed, a basket in which said shaft is journaled, oppositely-disposed screws for adjusting said basket vertically, and gearing for turning said screws in unison.

5. In a system of the character described, a conduit for conducting water from an upper to a lower point of a stream, a series of pressure-tanks arranged above the adjacent portions of the conduit but below its intake end, by-passes communicating with the conduit and said pressure-tanks whereby a portion of the water is carried back to the conduit, outlets through which the remainder of the water flows from the pressure-tanks, wells below the pressure-tanks and communicating with the outlets thereof, said wells having outlets in their lower ends, and power wheels within said wells.

6. In a system of the character described, a conduit for conducting water from an upper to a lower point of a stream, a series of pressure-tanks arranged at intervals along said conduit and above the adjacent portions thereof, a by-pass communicating with each pressure-tank and the conduit, a valve on the conduit between the terminals of each by-pass, valves at each side of the pressure-tank for controlling the flow of water to and from the by-pass, a well sunk to a level below the pressure-tank and communicating with the discharge opening therefrom, said well having an outlet in its lower end, and a turbine in said well.

7. In a system of the character described, a pressure-tank arranged above the adjacent portion of a stream but having communication with said stream at a higher level than the lower portion of the tank, a waste-pipe leading from said tank, a safety-valve controlled by the pressure in the tank for opening and closing communication to said waste-pipe, a discharge-pipe leading from the lower portion of the tank, and a power-wheel adapted to be driven by the water from said discharge-pipe.

8. In a system of the character described, a pressure-tank arranged above the adjacent portion of the stream but having communication with said stream at a higher level than the lower portion of the tank, a well into which said pressure-tank discharges, said well being closed at its upper end and having a discharge outlet at its lower end, and a power-wheel mounted in said well.

9. In a system of the character described, a well having ingress and egress openings at its ends for the inlet and outlet of water, a power-wheel arranged within said chamber, and means interposed between said power-wheel and the inner wall of the chamber whereby all of the water passing through said chamber is compelled to pass through the power-wheel.

10. In a system of the character described, a chamber having ingress and egress openings at its ends for the inlet and outlet of water, a vertically-adjustable power-wheel arranged within said chamber, and means surrounding said power-wheel and slidingly engaging the inner wall of the chamber to compel all of the water passing through said chamber to pass through the power-wheel.

11. In a system of the character described, a vertically-arranged chamber open at its upper end, a cover for closing said upper end provided with an inlet pipe for the admission of water, a discharge pipe leading from the lower end of the chamber, and a vertically-adjustable power-wheel mounted within the chamber and adapted to be driven by the water passing therethrough.

In testimony whereof I affix my signature, in the presence of two witnesses.

CORNELIS F. A. RÖELL.

Witnesses:
   F. G. Fischer,
   M. Cox.